US012500246B2

(12) United States Patent
Gadelrab et al.

(10) Patent No.: US 12,500,246 B2
(45) Date of Patent: Dec. 16, 2025

(54) ELECTROCHEMICAL CELL ELECTROCATALYST

(71) Applicant: Robert Bosch GmbH, Stuttgart (DE)

(72) Inventors: Karim Gadelrab, Boston, MA (US); Mordechai Kornbluth, Brighton, MA (US); Soo Kim, Fremont, CA (US); Jonathan Mailoa, Cambridge, MA (US)

(73) Assignee: Robert Bosch GmbH, Stuttgart (DE)

( * ) Notice: Subject to any disclaimer, the term of this patent is extended or adjusted under 35 U.S.C. 154(b) by 841 days.

(21) Appl. No.: 17/842,316

(22) Filed: Jun. 16, 2022

(65) Prior Publication Data

US 2023/0411639 A1   Dec. 21, 2023

(51) Int. Cl.
*H01M 4/92*   (2006.01)
*H01M 8/1004*   (2016.01)

(52) U.S. Cl.
CPC ......... *H01M 4/926* (2013.01); *H01M 8/1004* (2013.01)

(58) Field of Classification Search
CPC ....... B01J 23/42; H01M 4/926; H01M 8/1004
USPC ............. 502/339; 429/524; 977/811
See application file for complete search history.

(56) References Cited

U.S. PATENT DOCUMENTS

| 7,858,550 | B2 * | 12/2010 | Dressick | ............. | H01M 4/8825 |
| | | | | | 502/185 |
| 2007/0003822 | A1 * | 1/2007 | Kocha | .................. | H01M 4/926 |
| | | | | | 429/535 |
| 2023/0395818 | A1 * | 12/2023 | Ishida | .................... | B22F 1/054 |

FOREIGN PATENT DOCUMENTS

| CN | 108607547 B | 11/2020 | |
| JP | 5428109 B2 | 2/2014 | |
| JP | 2021156819 A | * 10/2021 | ............... G01K 7/02 |
| WO | 2010065014 A1 | 6/2010 | |

OTHER PUBLICATIONS

Dong Huang et al., "Structure and dynamics of microbial fuel cell catalyst layer." Electrochimica Acta 300, pp. 404-416. (Year: 2019).*
Adriaan J. M. Mackus et al., "Influence of Oxygen Exposure on the Nucleation of Platinum Atomic Layer Deposition: Consequences for Film Growth, Nanopatterning, and Nanoparticle Synthesis." Chemistry of Materials 25, pp. 1905-1911. (Year: 2013).*
Myers et al., "Potentiostatic and Potential Cycling Dissolution of Polycrystalline Platinum and Platinum Nano-Particle Fuel Cell Catalyst," Journal of the Electrochemical Society, 165 (6) F3178-F3190 (2018).
Gilbert et al., In Situ Anomalous Small-Angle X-ray Scattering Studies of Platinum Nanoparticle Fuel Cell Electrocatalyst Degradation, J. Am. Chem. Soc. 2012, 134, 14823-14833.

(Continued)

*Primary Examiner* — Patricia L. Hailey
(74) *Attorney, Agent, or Firm* — BROOKS KUSHMAN P.C.

(57) ABSTRACT

An electrocatalyst includes a conglomerate of platinum atoms forming an amorphous nanoparticle structure having at least about 40% of highly undercoordinated surface atoms with fewer than 6 adjacent atoms on its surface; and a passivating crust including catalytically active monoatomic adsorbed oxygen atoms such that at least 50% of the amorphous nanoparticle structure has oxygen coverage, the amorphous nanoparticle structure having a diameter of up to 3 nm.

19 Claims, 8 Drawing Sheets

(56) References Cited

OTHER PUBLICATIONS

Antony et al., Nanoscale Structure and Dynamics of Water on Pt and Cu surfaces from MD simulations, Langmuir 2018, 34, 39, 11905-11911.

Ferreira de Morais et al., "Coverage-dependent thermodynamic analysis of the formation of water and hydroen peroxide on a platinum model catalyst," Phys. Chem. Chem. Phys., 2015, 17, 11392.

Ahluwalia et al., "Thermodynamics and Kinetics of Platinum Dissolution from Carbon-Supported Electrocatalysts in Aqueous Media under Potentiostatic and Potentiodynamidc Conditions," Journal of the Electrochemical Society, 160 (4) F447-F455 (2013).

Ahluwalia et al., "Potential Dependence of Pt and Co Dissolution from Platinum-Cobalt Alloy PEFC Catalysts Using Time-Resolved Measurements", Journal of the Electrochemical Society, 165 (6) F3024-F3035 (2018).

Huang et al., "Unifying theoretical framework for deciphering the oxygen reduction reaction on platinum," Phys. Chem. Chem. Phys., 2018, 20, 11776-11786.

\* cited by examiner $H_2O \longrightarrow 2H^+ + 1/2 O_2 + 2e^-$  Anode
$2H^+ + 2e^- \longrightarrow H_2$  Cathode
$H_2O \longrightarrow H_2 + 1/2 O_2$  Total Reaction

ELECTROCHEMICAL CELL ELECTROCATALYST

TECHNICAL FIELD

The present disclosure relates to an electrocatalyst of an electrochemical cell, its use, and methods of making the same.

BACKGROUND

With growing interest in green technologies worldwide, electrochemical cells such as fuel cells and electrolyzers are top candidates for various applications. Yet, many challenges need to be resolved prior to a wide-spread electrochemical cell implementation. Among the challenges are material corrosion and deterioration, factors influencing effectiveness and efficiency of the cells such as oxygen transport within the cell layers, as well as catalyst-related factors such as cost and stability.

SUMMARY

In at least one embodiment, an electrocatalyst is disclosed. The electrocatalyst may include a conglomerate of platinum atoms forming an amorphous nanoparticle structure having at least about 40% of highly undercoordinated surface atoms with fewer than 6 adjacent atoms on its surface. The electrocatalyst may also include a passivating crust including catalytically active monoatomic adsorbed oxygen atoms such that at least 50% of the amorphous nanoparticle structure has oxygen coverage. The electrocatalyst may further include the amorphous nanoparticle structure having a diameter of up to 3 nm. The amorphous nanoparticle structure may have a disorderly, irregular surface lacking a clear facet organization. The amorphous nanoparticle structure may include an amorphized internal structure. The passivating crust may further include one or more species of $PtO_x$, where x is 1-3. A ratio of the monoatomic adsorbed oxygen atoms to the one or more species of $PtO_x$ may be up to about 3:1. The electrocatalyst may have an internal structure more orderly than an outer surface. The amorphous nanoparticle structure may include at least about 50% Pt. The passivating crust may be amorphous.

In another embodiment, a cathode catalyst layer (CCL) is disclosed. The CCL may include an electrocatalyst support, an electrocatalyst attached onto the support, the electrocatalyst having a highly amorphous nanoparticle structure including a plurality of inner atoms and surface atoms. The surface atoms may include at least about 30% atoms with lone pairs having a coordination number of less than 6, based on the total mass of the surface atoms. The electrocatalyst may further have a stable corrosion-resistive layer of adsorbed oxygen species covering at least 50% of the surface atoms. The adsorbed oxygen species may include a catalytically active monoatomic oxygen. The adsorbed oxygen species may include one or more species of $PtO_x$, where x is 1-3. The highly amorphous nanoparticle structure may include at least about 50% Pt. The highly amorphous nanoparticle structure may have a diameter of up to about 3 nm. More than about 50% of the inner atoms may have a coordination number of up to 12. An entire electrocatalyst may be non-crystalline.

In yet another embodiment, an electrochemical cell is disclosed. The cell may include an anode, a membrane separating the anode from a cathode, and the cathode. The cathode may include a CCL having an electrocatalyst including a plurality of platinum ultra-fine, highly amorphized nanoparticles, each having a diameter of up to about 3 nm and having an amorphous inner core covered with a passivating crust of oxygen species adsorbed onto the surface of the amorphous inner core at more than 50% surface coverage. The oxygen species may include a catalytically active monoatomic oxygen. The oxygen species may be dispersed on the surface of the amorphous inner core in an irregular manner. The electrocatalyst loading in the cathode catalyst layer may be variable. The CCL may further include a second Pt electrocatalyst having a diameter greater than 3 nm.

DETAILED DESCRIPTION

Figure 1A:
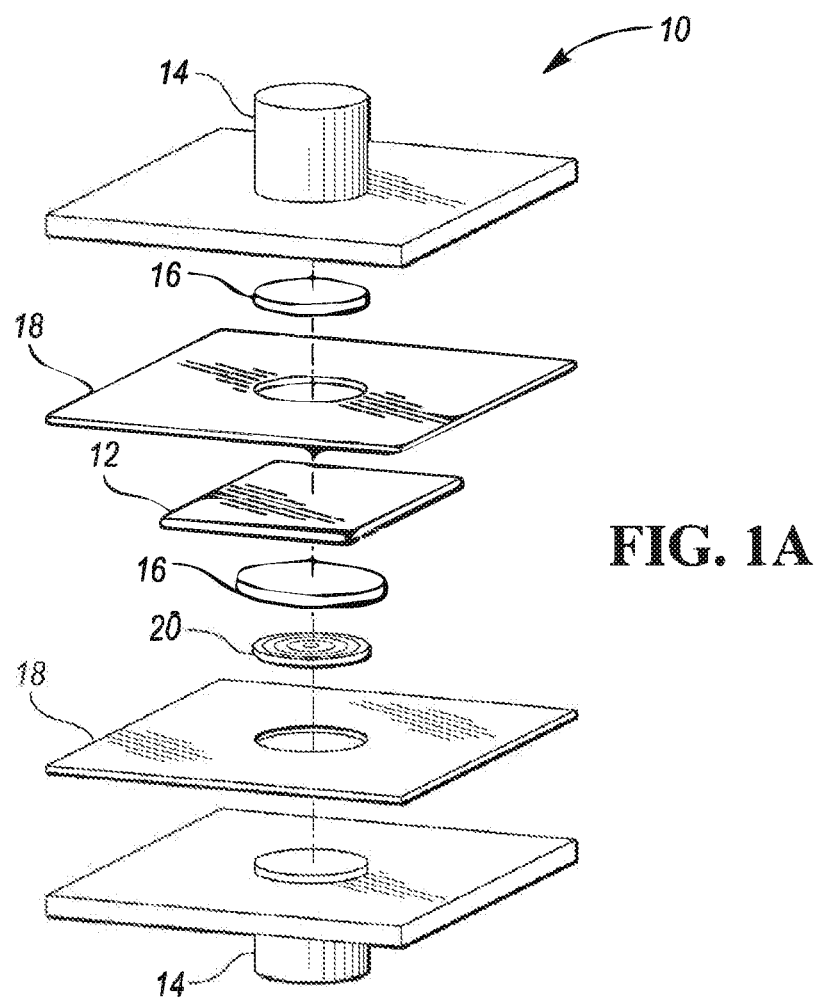
FIG. 1A shows a non-limiting example of a fuel cell and its components in an exploded view.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of" and "consisting essentially of" where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Chemical and electrochemical systems utilizing hydrogen as a fuel source are considered the energy systems of the future either in direct hydrogen combustion engines or fuel cells. These hydrogen-producing devices are becoming increasingly popular due to their ability to produce clean energy. The systems may include fuel cells, electrolysis cells or electrolyzers, and battery cells. Fuel cells, or electrochemical cells, that convert chemical energy of a fuel (e.g. $H_2$) and an oxidizing agent into electricity through a pair of electrochemical half (redox) reactions, have become an increasingly popular hydrogen-fuel-generating technology. Fuel cells are now a promising alternative transportation technology capable of operating without emissions of either toxins or green-house gases.

Figure 1B:
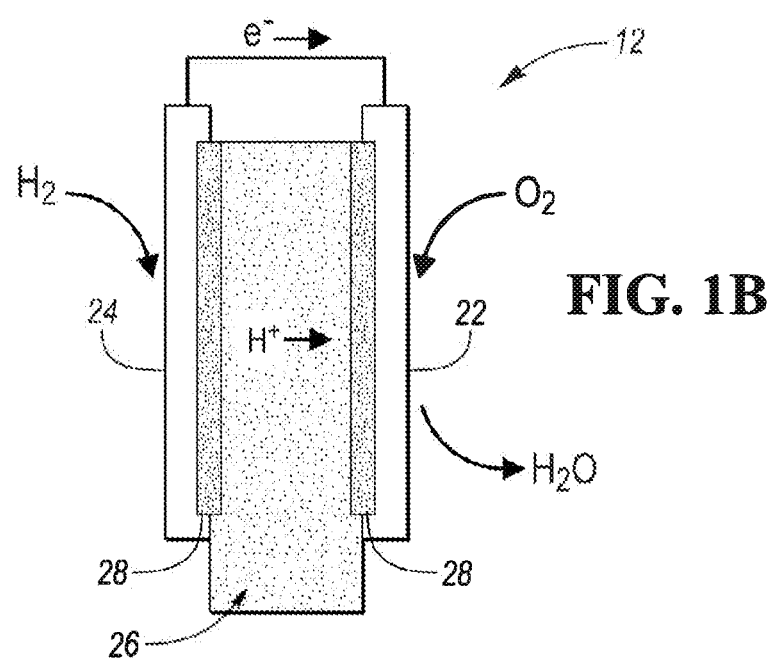
FIG. 1B shows a schematic depiction of a membrane electrode assembly (MEA) and its functioning principle.

A non-limiting example of a fuel cell, a proton-exchange membrane fuel cell (PEMFC) is depicted in FIG. 1A. A core component of the PEMFC 10 that helps produce the electrochemical reaction needed to separate electrons is the Membrane Electrode Assembly (MEA) 12. The MEA 12 includes subcomponents such as catalyst-coated cathode 22 and anode 24 electrodes separated by a proton-conductive ionomer or ionomer membrane 26; catalyst is denoted as 28 in a schematic depiction of MEA in FIG. 1B. Besides MEA 12, the PEMFC 10 typically includes other components such as current collectors 14, gas diffusion layer(s) 16, gaskets 18, and bipolar plate(s) 20.

The anode performs the hydrogen oxidation reaction (HOR) (1) while the cathode performs the oxygen reduction reaction (ORR) (2):

$$H_2 \rightarrow 2H^+ + 2e^- \quad (1)$$

$$4H^+ + O_2 + 4e^- \rightarrow H_2O \quad (2)$$

Generally, the $H_2$ is broken down on the surface of the electrocatalyst in the anode to form protons and electrons in a HOR. The electrons are transported through the support of the anode catalyst layer to the external circuit while the protons are pulled through the proton exchange membrane (PEM) to the cathode catalyst layer (CCL). Once in the CCL, the protons move through the ion-conducting polymer or ionomer thin-film network to the electrocatalyst surface, where they combine with the electrons from the external circuit and the $O_2$ that has diffused through the pores of the CCL to form water in the ORR.

Besides fuel cells, electrolyzers present another type of an electrochemical cell. Electrolyzers use electrical energy to conduct chemical reactions. Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and CLLs of the electrolyzer.

Besides fuel cells, the electrolyzer may be utilized in other applications including industrial, residential, and military applications and technologies focused on energy storage such as electrical grid stabilization from dynamic electrical sources including wind turbines, solar cells, or localized hydrogen production.

Figure 2A:
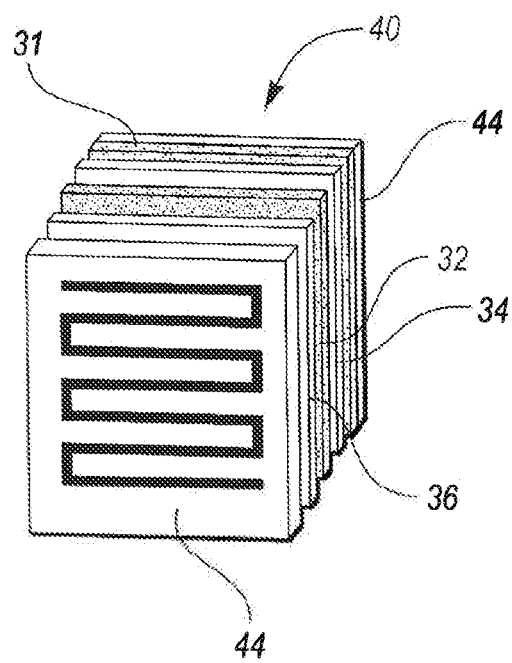
FIG. 2A shows a schematic view of a non-limiting example of an electrolyzer stack.

A typical single electrolyzer is composed of an electrolyte membrane, an anode layer, and a cathode layer separated from the anode layer by the electrolyte membrane. A non-limiting schematic depiction of an electrolyzer stack 40 is shown in FIG. 2A. The electrolyzer stack 40 includes individual electrolyzer cells 31, each of which includes the membrane 32, electrodes 34, 36, and bipolar plates 44. A catalyst material, such as Pt-based catalysts, is included in the anode and cathode layers 34, 36 of the electrolyzer stack 40. At the anode layers 34, $H_2O$ is hydrolyzed to $O_2$ and $H^+$ ($2H_2O \rightarrow O_2 + 4H^+ + 4e^-$). At the cathode layers 36, $H^+$ combines with electrons to form $H_2$ ($4H^+ + 4e^- \rightarrow 2H_2$).

Figure 2B:
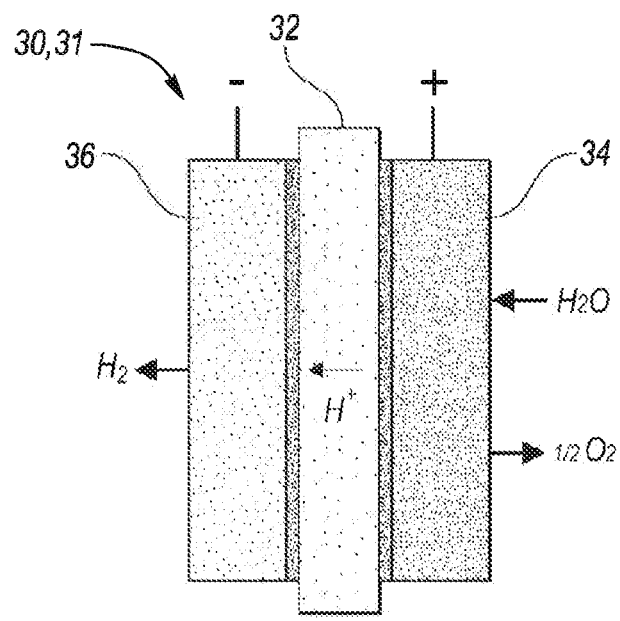
FIG. 2B is a schematic depiction of the electrolysis principle.

A depiction of the electrolysis principal, utilized by a PEM electrolyzer 30, with relevant reactions is depicted in FIG. 2B. The electrolyzer 30 includes the PEM 32, anode 34, and cathode 36. Each electrode includes a porous transportation layer (PTL) and a catalyst layer. During electrolysis, water is broken down into oxygen and hydrogen in anodic and cathodic electrically driven evolution reactions. The reactant liquid water ($H_2O$) permeates through the anode 34 PTL to the anode catalyst layer, where the oxygen evolution reaction (OER) occurs. The protons ($H^+$) travel via the PEM 32, and electrons (e-) conduct through an external circuit during the hydrogen evolution reaction (HER) at the cathode 36 catalyst layer. The anodic OER requires a much higher overpotential than the cathodic HER. It is the anodic OER which determines efficiency of the water splitting due to the sluggish nature of its four-electron transfer.

Electrocatalysts play crucial role in the electrochemical cells as they enable the HOR, HER, ORR, and OER reactions. Electrocatalysts are typically included in a form of particles. To increase their stability and prevent their loss via dissolution or detachment, the catalysts may be attached to a support. The most frequently used catalysts are noble metals such as platinum (Pt), palladium (Pd), Iridium (Ir) or their combination. The support may typically include carbon, metals, metal oxides, or their combination.

Electrocatalyst durability in electrochemical processes is a topic of great interest to guarantee stable performance of the electrochemical cells and devices. For example, stability of Pt nanoparticles (NPs) in PEMFC is a major technological challenge for PEMFC commercialization. Pt dissolution is typically observed when PEMFC operation is cycled into oxide formation voltage (>0.9V).

Carbon-supported platinum is currently the most widely used electrocatalyst in PEMFC and is a major contributor to PEMFC cost. Despite its maturity and improved performance, lifetime and stability of PEMFC are greatly limited by the catalyst corrosion and degradation processes occurring on the surface of the catalyst, resulting in mass loss, structural evolution, and/or reduction in catalytically electrochemical active surface area (ECSA).

Efforts to analyze ECSA loss has demonstrated fast Pt degradation and performance loss with an increasing cell voltage above 0.8 V. Degradation is greatly accelerated by potential cycling versus potential hold conditions. The degradation increases with increasing upper limit of voltage cycling. Experiments suggest that ECSA loss is predominantly due to Pt dissolution and that the potential dependent loss processes are linked to the relationship between dissolution and formation and reduction of platinum oxides. However, there is disagreement as to the role of Pt oxides in Pt loss. Some authors speculate that Pt dissolution primarily occurs during the ramp up of potential and is assisted by the formation of oxides, either directly or as a result of surface roughening incurred during oxide reduction or to chemical dissolution of Pt oxides. Others attribute Pt loss to Pt metal dissolution with oxide playing a passivating and protective role.

Overall, there is an evident need for an improved, more stable electrocatalyst for electrochemical cell use and a method of preventing or minimizing dissolution of the electrocatalyst in electrochemical cells.

In one or more embodiments, an electrochemical cell system is disclosed. The system may be a fuel cell or an electrolyzer. The system includes components described above with respect to fuel cells and electrolyzers. The system includes an electrocatalyst in the cathode catalyst layer, anode catalyst layer, or both.

The electrocatalyst has a unique structure. The electrocatalyst may include one or more particles. The particles may include noble metals such as Pt. The particles may form a conglomerate.

Figure 3:
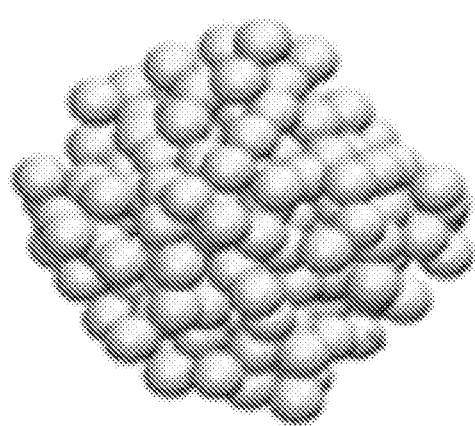
FIG. 3 show a non-liming example of an amorphous platinum (Pt) nanoparticle (NP) disclosed herein.
Figure 4:
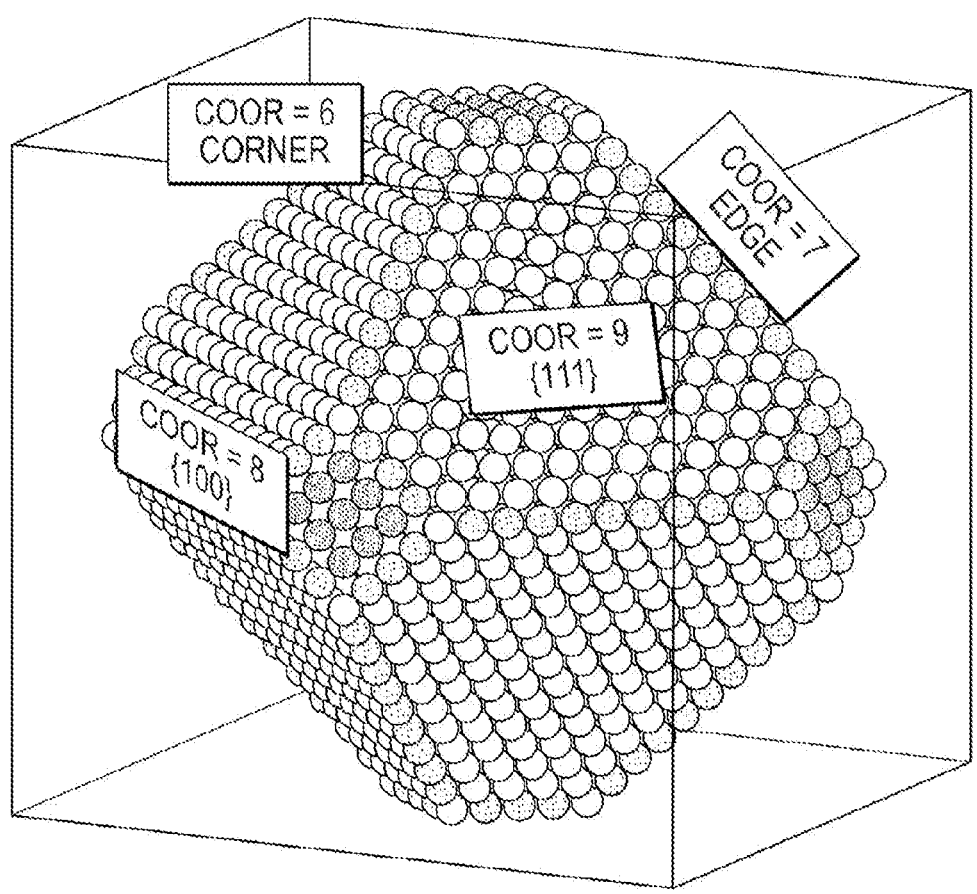
FIG. 4 shows a prior art, traditional crystalline structure of a Pt NP.

The electrocatalyst has an amorphous structure. A non-limiting example of a herein-disclosed amorphous NP is shown in FIG. 3. The amorphous structure is in contrast with the typical Pt-based electrocatalyst which has a crystalline structure with a plurality of facets. Using Wulff construction, the equilibrium shape of a Pt nanoparticle at zero temperature were shown to be a truncated octahedron consisting of {111} and {100} facets. FIG. 4 shows schematically an equilibrium traditional Pt NP shape, where particle surface is dominated by {111} (Pt atoms are 9 coordinated). Octahedron truncations are observed for the {100} surfaces with 8 coordination of Pt. In addition, only edge and corner atoms are generally undercoordinated at 7 and 6, respectively. Particle sizes bigger than 3 nm have more than about 70% of its surface covered by the stable {111} facets.

The herein-disclosed electrocatalyst has a smaller diameter than typical Pt-based electrocatalysts. The diameter of the herein-disclosed NPs may be smaller than about 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, or 1.0 nm. The electrocatalyst may thus include ultra-small or ultra-fine nanoparticles. The diameter may be a diameter of the entire electrocatalyst including the crust discussed below. The crust thickness may be about 0.0.5-0.5, 0.07-0.04, or 0.1-0.3 nm. The crust thickness may be about 0.05, 0.06, 0.07, 0.08, 0.09, 0.1, 0.11, 0.12, 0.14, 0.15, 0.16, 0.17, 0.18, 0.19, 0.20, 0.21, 0.22, 0.23, 0.24, 0.25, 0.26, 0.27, 0.28, 0.29, or 0.3 nm.

The amorphous structure of the herein-disclosed ultra-fine particles includes highly undercoordinated atoms with a coordination number, or a surface coordination number, of at most about, less than about, or about 6, 5, 4, 3, or 2. The NP may include up to about, at least about, or more than about 10, 15, 20, 25, 30, 35, 40, 45, 50, 55, 60, 65, 70, 75, 80%, or more of surface atoms which are undercoordinated (having fewer than 6 adjacent Pt atoms), based on the total number of surface atoms.

The NPs may have a more orderly internal structure and less orderly outer surface. For example, the surface atoms may have a coordination number less than 6 while the inner portion of the NP may have a coordination number of up to 12. The amorphous structure may include more than 50, 60, 65, 70, 75, 80, 85, or 90% of internal atoms having fewer than 12 adjacent Pt atoms.

The change of Pt coordination population impacts particle stability as typically, small particles have higher tendency to degrade and dissolve during electrochemical corrosion. This has been demonstrated by a Gibbs-Thomson relation—the chemical potential depends on the size of a particle: the bigger the particles, the smaller the chemical potential and the lower the tendency for a structure to evolve. The 3 nm particle cutoff and its effect on catalyst performance and stability was observed experimentally in both electrochemical cells and MEA setups. Therefore, NPs having a diameter smaller than 3 nm have been traditionally considered impractical and unwanted in the electrochemical systems as they easily disintegrate.

As can be seen in FIG. 3, the NP disclosed herein includes a conglomerate of Pt atoms having a disorderly structure and lacking a clear facet organization, which is typical for Pt NPs. The NPs disclosed herein may have a severely distorted or deformed surface arrangement of Pt atoms, amorphized internal structure, or both. The amorphous structure may render it a single-atom-like electrocatalyst. The amorphous structure provides or enables catalytic activity of the NPs. The NP's surface may include a plurality of lone atoms or atoms with lone pairs which may form a substantial fraction of surface atoms. The fraction of lone atoms may be about 30-70, 45-65, or 50-55%, based on the total mass of surface atoms. The fraction may be about, at least about, or more than about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 82, 84, 86, 88, 90, 92, 94, 96, or 95%, based on the total mass of surface atoms.

The disclosed NP may have a partially amorphous and partially crystalline structure. Such atomic arrangement may be, for example, at a diameter of about 2.5-3.5, 2.8-3.3, or 3-3.2 nm and surface oxidation of less than about 50%. The partially amorphous and partially crystalline structure may have about 25-75% surface atoms arranged as highly undercoordinated atoms and about 25-75% surface atoms arranged in a regular crystalline lattice with facets.

For small Pt NPs to be practically utilized as a catalyst, they have to withstand reducing conditions since this is where Pt dissolution is typically observed. Since small particles are typically easily detached or dissolved from the catalyst layers, their use has been deemed impractical.

Hence, the electrocatalyst disclosed herein is protected from dissolution by being highly oxidized. The surface or a portion of the surface of the NP may include a passivating oxygen and/or oxide layer, skin, coating, crust, the like, or a combination thereof. The layer or skin is introduced to protect the ultra-fine particles from dissolution in the presence of a highly reducing environment of an electrochemical cell.

Figure 5A:
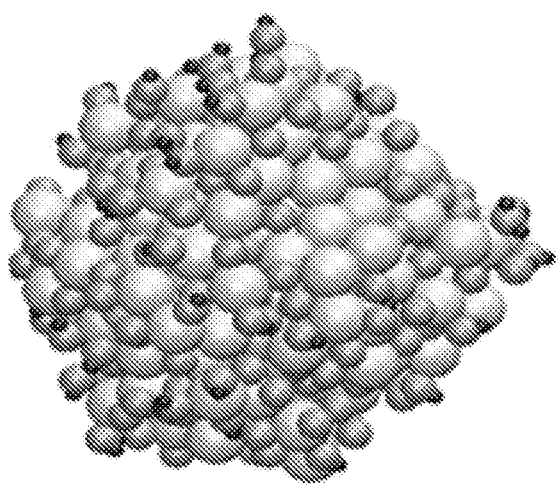
FIG. 5A shows a non-liming example of the highly oxidized amorphous Pt NP according to one or more embodiments disclosed herein.
Figure 5B:
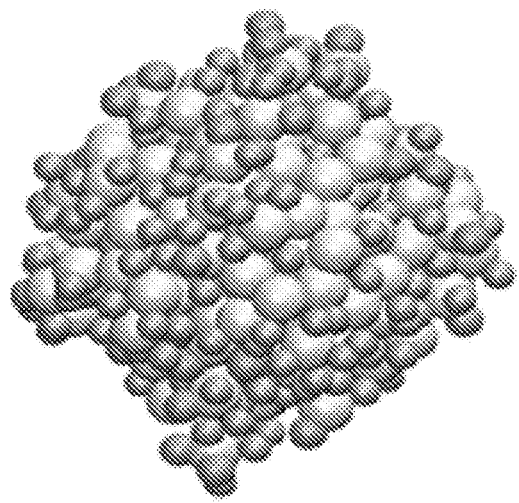
FIG. 5B shows a non-liming example of the highly oxidized amorphous Pt NP according to one or more embodiments disclosed herein having a surface with catalytically active monoatomic adsorbed oxygen and platinum oxide species.

The layer, skin, or crust is for example shown in FIGS. 5A, 5B as oxygen atoms having a smaller diameter than the PT larger atoms. The oxygen atoms may be protruding from the surface of the amorphous conglomeration of the Pt larger atoms. The oxygen atoms may be dispersed along the NP surface in a random, irregular manner/pattern. The skin or crust may form a complex, deformed layer of atoms around the Pt atoms. The crust may be a continuous layer at oxygen coverage of at least about 50%. The crust may be a discontinuous layer at oxygen coverage lower than about 50%.

The skin or layer may include oxygen atoms protruding out of the amorphous Pt structure into various distances from the Pt atoms. The skin or layer may itself have amorphous character or structure. The skin may be uniformly amorphous. The layer or skin may be a stable corrosion-resistive layer or skin.

The concentration of the oxygen atoms or oxides on the NP surface may be variable, portions of the surface having a lower concentration than at least one other portion. The crust atoms may form agglomerations or formations of up to about four atoms in close proximity or adjacent to one another. The skin or layer may include a plurality of oxygen atoms or oxides accumulated in close proximity of one another, forming an area of the skin with oxygen concentration c1. The skin or layer may also include an area with oxygen concentration c2. c1 may be different than or the same as c2. c1 may be greater, equal to, or smaller than c2.

The crust may include oxygen in one or two forms: (a) a catalytically active oxygen that is a precursor for the reaction with protons and (b) a higher form of platinum oxide $PtO_x$ that is amorphous in nature. The catalytically active oxygen includes monoatomic adsorbed oxygen atoms having an identifiable peak at 1.8 A. The monoatomic oxygen is able to react with protons to produce water. The monoatomic oxygen was initially in water (dissolved) around the NP. The presence of the monoatomic oxygen is demonstrated in the plot of FIG. 8 discussed below.

Figure 6:
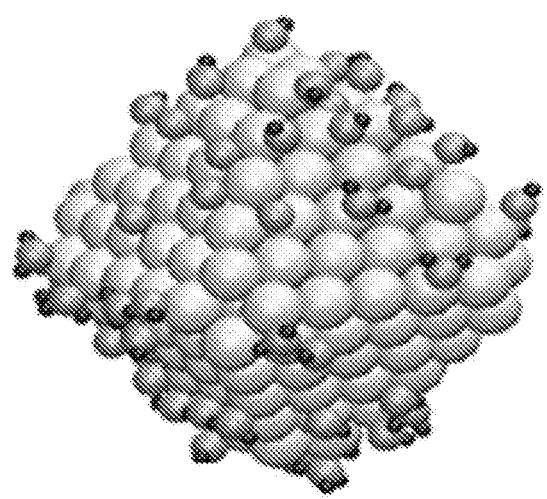
FIG. 6 shows a crystalline, oxidized structure of a prior art, traditional Pt NP.

The herein-disclosed NP with oxygen atoms on the Pt atomic surface is shown in FIGS. 5A and 5B. In FIGS. 5A and 6, the largest atoms are Pt, the middle size atoms are oxygen, and the smallest atoms are hydrogen. FIG. 5A shows the large Pt atoms with the oxygen atoms that are part of $PtO_x$ and has a PtO bond length of about 2.3 A. FIG. 5B depicts both the catalytically active oxygen and platinum oxide species. In FIG. 5B, the large atoms are Pt and the smaller atoms, light and dark, are oxygen atoms. The darker smaller atoms represent oxygen atoms that are part of $PtO_x$ and has a PtO bond length of about 2.3 A. The lighter smaller atoms represent catalytically active monoatomic oxygen with a PtO bond length of about 1.8 A.

The $PtO_x$ species may include at least two different PtO species. Example PtO species may include those discussed below and shown in FIG. 9. The $PtO_x$ may include one or more species, where x is any number between 1 and 3. Non-limiting example PtO species may include PtO, $PtO_2$, $PtO_3$, or their combination. The NP's Pt structure is at least partially amorphous. Besides, the $PtO_x$ on the surface may be also amorphous. The $PtO_x$ may thus increase the degree of amorphization of the entire NP. The presence of the $PtO_x$ is demonstrated in the plots of FIGS. 8 and 9 discussed below.

The ratio of the catalytically active oxygen to $PtO_x$ present in the skin may be about, at least about, up to about, more than about 1:1, 2:1, 3:1, 4:1, 5:1, 6:1, 7:1, 8:1, 3:2, 5:4, or 8:7.

The degree of oxidation of the herein-disclosed NPs is higher than what is typical for traditional crystalline Pt NPs. FIG. 5A shows a highly oxidized surface of an amorphous particle. FIG. 6 shows a relatively low degree of oxidation of a traditional crystalline Pt PN. The degree of their crystallinity/amorphization is compared via a simulation discussed below.

It was surprisingly discovered that the degree of surface oxidation plays a varying role with respect to the NPs' degradation. While partial surface oxidation has rather damaging effect on the stability of the NPs, a higher surface coverage may provide protective and/or passivating effect on the NPs. Hence, the NPs disclosed herein may include a highly oxidized surface with more than about or at least about 50, 55, 60, 65, 70, 75, 80, 85, 90, 95, 99, or 100% oxide coverage of each NP surface.

The overall electrocatalyst structure may be described as having an inner core formed by the amorphous structure and an outer crust adsorbed onto the core. The crust may provide full, complete, or partial coverage of the inner core discussed herein. The coverage may be sporadic. Due to the amorphous nature of the electrocatalyst, the individual atoms forming the crust may be located closer to the particle center than at least some of the Pt atoms.

Due to the combination of the ultra-small size, highly oxidized surface, and the amorphous structure, the electrocatalyst exhibits better durability/stability than a traditional Pt-based electrocatalyst having crystal structure and/or larger diameter. Due to its size, the herein-disclosed electrocatalyst also presents cost savings due to a lower loading of Pt. The structural characteristics of small NPs (diameter D<3 nm) at varying degrees of oxidation underline the potential of such systems to induce a unique electrochemical response driven by the Pt atomic arrangement and the strong surface contribution to the NP behavior.

The NP non-oxygen composition may include at least about 50, 55, 60, 65, 70, 75, 80, or 85% Pt. The NP non-oxygen surface composition may include at least about 75, 80, 85, 90, or 95% Pt. The remainder may include material such as Co, Pd, W, Ni, Fe, Mn, the like, or their combination. The electrocatalyst may thus include pure Pt or a Pt-based alloy, PtM, where M is a transition metal, Co, Pd, W, Ni, Fe, Mn, or the like.

The herein-disclosed NP may be provided on a support. The support material may be carbon-based. The carbon support may have a plurality of forms and variations such as graphite, carbon black, activated carbon fibers, fullerenes, nanotubes, nanofibers, the like, or a combination thereof. Alternatively, the support may be a metal oxide or metal.

The herein-disclosed NPs may be used as an electrocatalyst on a catalyst support in a CCL, ACL, or both of an electrochemical device such as fuel cell, PEMFC, electrolyzer, or the like. The amorphous, highly oxidized NPs may be used throughout the catalyst layer in a desirable loading. Alternatively, the NPs may be combined with different electrocatalyst or electrocatalyst NPs throughout the catalyst layer or stack. For example, the amorphous, highly oxidized NPs may be used in one or more hotspots of a cell stack that is more prone to degradation than other areas. In a non-limiting example, the herein-disclosed particles may be included as an electrocatalyst near a fuel cell flow field outlet.

In another non-limiting example, the highly oxidized NPs may be used in alternating cells of the stack, such that a first, third, etc. cell includes the highly oxidized NPs and the second, fourth, etc. cell includes a different type of electrocatalyst. In another non-limiting example, a catalyst layer, cell, or stack may include about, up to about, or at least about 10, 20, 30, 40, 50, 60, 70, 80, or 90 wt. or vol. % of the highly oxidized NPs, based on the total weight or volume of the electrocatalyst.

Overall, because the particle size is smaller, but the NPs are more effective, than traditional NPs, the production cost is lower and expected efficiency and performance is higher. Overall, implementation of the herein-disclosed NPs presents a cost benefit for an electrochemical cell system having such implementation.

A method of producing the herein-disclosed NPs is disclosed herein. The "degradation-free" high oxygen coverage Pt NP material disclosed herein may be prepared by a material synthesis. The ultra-small Pt NPs may be fabricated and post-processed to have a thick oxide layer before being dispersed on a catalyst support such as a carbon-based support. The disordered amorphous structure of the NPs may be formed by flash-heating with a plasma, pulsed-laser melting, or another rapid melting and cooling which can freeze the particle in a disordered state. The method may include post-processing via which the particle may gain its highly oxidized surface. The post-processing may include heating, exposure to basic or oxidizing solutions, the like, or a combination thereof. The amorphous, oxidized ultra-small Pt NPs may be subsequently dispersed on a catalyst support or used with a catalyst support that sustains highly oxidizing conditions.

EXPERIMENTAL SECTION

Experiment A

Figure 7:
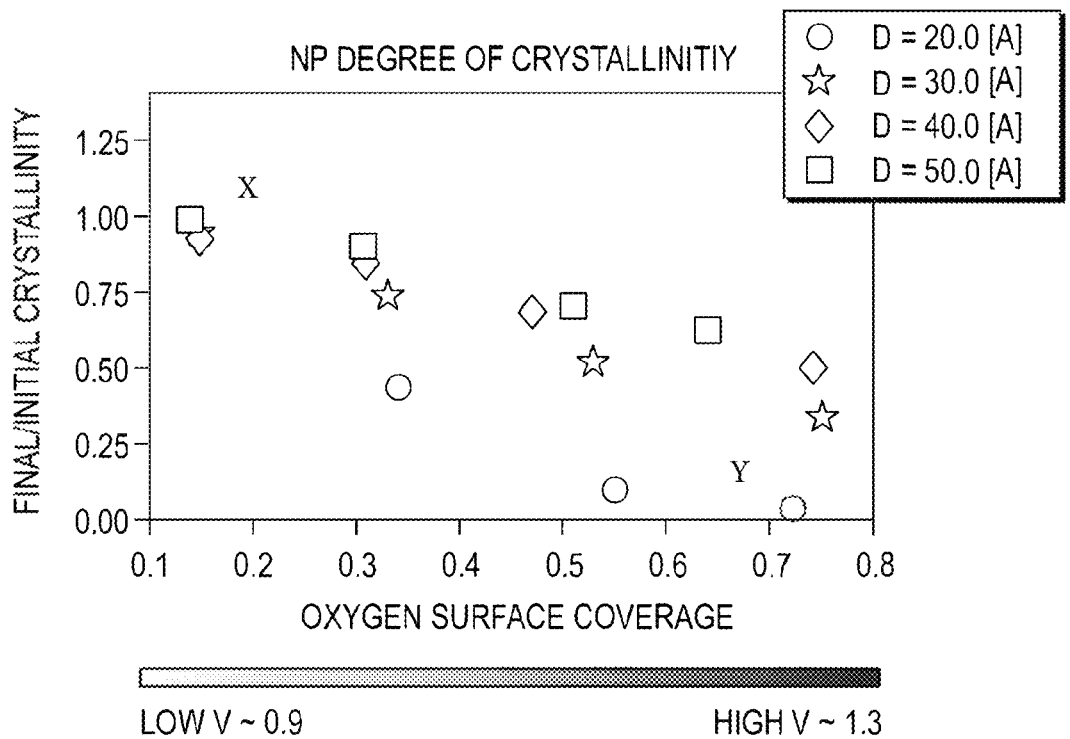
FIG. 7 shows a plot of degree of crystallinity dependent on oxygen surface coverage and particle size.

Molecular dynamics (MD) simulation was prepared to evaluate the role of particle size with respect to its oxidation. FIG. 7 shows the results of the evaluation. FIG. 7 shows the degree of crystallinity of NPs, defined by the number of Pt atoms that are 12 coordinated inside the NP, for different oxidation levels. As can be seen from the plot of FIG. 7, a decrease in particle degree of crystallinity was observed with the increase of oxidation levels. The effect was very prominent for small NPs such as NPs having a diameter of about 20 A or 2 nm. At the oxidation greater than about 50%, the small particles were effectively amorphous. Overall, the extent of crystallinity was much lower for particles of or below 3 nm in diameter, especially at D=2 nm, where the particle is effectively amorphous or free of a crystalline structure, at the degree of oxidation>about 50%. A traditional Pt NP of FIG. 6 is shown in FIG. 7 as X in comparison to the herein-disclosed NP, shown in FIG. 5A and captured in FIG. 7 as Y.

Experiment B1

Molecular dynamics simulation with reactive force fields was used to investigate the performance of the herein-disclosed ultra-small NPs (D<3 nm) in inducing a catalytic response even at high degrees of surface oxidation. The role on the oxide layer/skin to protect small NPs from dissolving in the presence of a highly reducing environment was studied. Specifically, three NPs at D=2 nm with different O surface coverages ($O_{cover}$) and O dissolved oxygen content ($O_{dis}$) were compared to an NP at D=5 nm.

Figure 8:
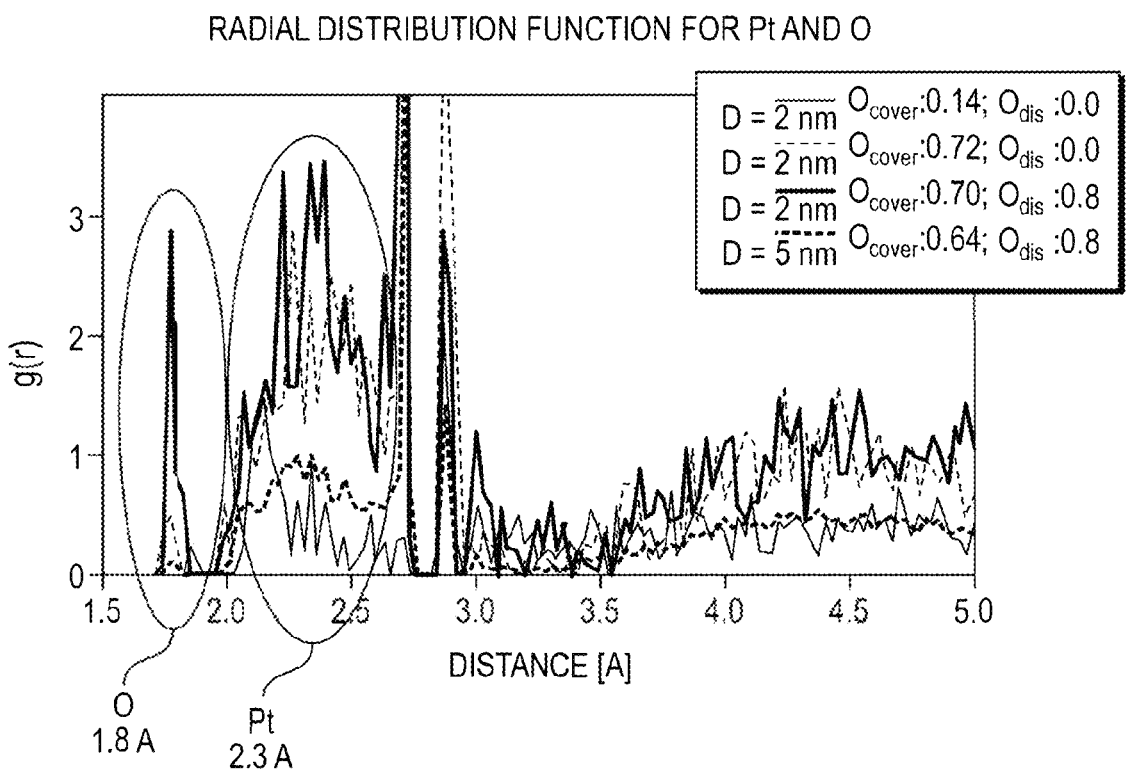
FIG. 8 is a plot of radial distribution function for Pt and O.

The small Pt NPs were solvated in water and dissolved oxygen. The level of surface oxidation and amount of dissolved oxygen were varied. Given the reactive nature of the simulation, oxygen atoms were free to adsorb/desorb from Pt surface, combine to create molecular oxygen, or exchange with water oxygen. The final system was analyzed to determine the nature of interaction between Pt and oxygen. FIG. 8 shows the radial distribution function g(r) for Pt and O. The plot is used to determine the proximity of Pt and O atoms and infer the possible structures that are produced. The g(r) shows a broad PtO peak at ~2.3[A] representing the amorphous oxidized surface of the NP. The peak is common to all oxide coverages and becomes more prominent as the percent oxide coverage increases.

In addition, a new peak emerged at 1.8 [A] which represented weakly attractive O (shown as the left-most oval-highlighted peak in the plot of FIG. 8) that is catalytically active. The 1.8 [A] is in excellent agreement with adsorbed O bond length, which was calculated using DFT. This form of monoatomic adsorbed O is the precursor of ORR as it is able to react with protons and produce water as a byproduct. The peak was only observed for small NPs (D=about 2 nm) and effectively missing for NPs with D=5 nm even at the highest degree of oxidation (64%) and largest amount of dissolved O (80%). The fraction area referenced to number of surface atoms in pristine Pt NP.

The distinct peak formation at 1.8 [A] which indicates adsorbed oxygen for a 2 nm particle, and the lack of it at for a 5 nm particle, is solely driven by NP structure and not its chemistry. The higher the peak at 1.8 A, the higher activity of the NP. Hence, it was demonstrated that two types of oxygen were present at NP surface: (1) catalytically active oxygen that is a precursor for the reaction with protons, and (2) a higher form of platinum oxide $PtO_x$ that is amorphous in nature. The adsorbed oxygen was only formed when there was dissolved oxygen in water and was distinct from the oxide layer at Pt surface as shown in FIG. 8. The 2 nm particle demonstrated a strong catalytic signal compared to the larger 5 nm NP.

Figure 9:
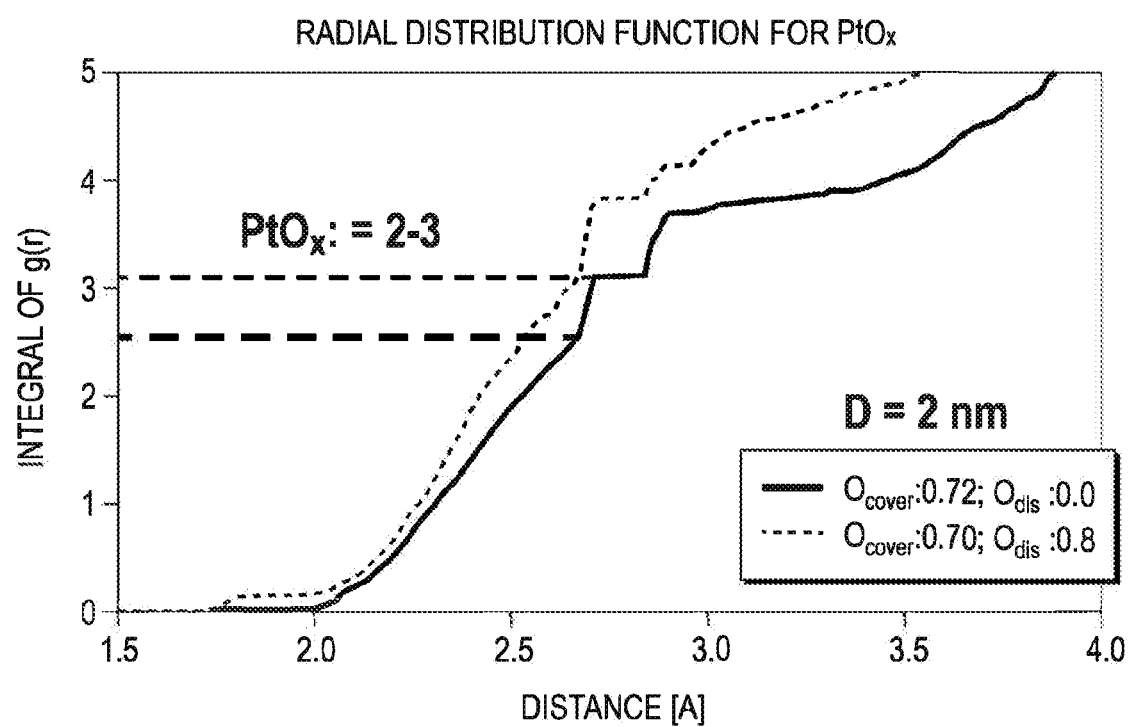
FIG. 9 shows integral of radial distribution function for $PtO_x$.

FIG. 9 further demonstrates a finding of two different species of $PtO_x$, which were identified via the radial function of PtO. The PtO broad distance of ~2.3 [A], shown in FIG. 8, is common to all oxide coverages and becomes more prominent as the percent oxide coverage increases. Integral of g(r) defines the nature of the amorphous oxide as $PtO_x$ with x=2 or 3, as shown in FIG. 9. The qualitative nature of the peak in g(r) was further quantified, where the amount of adsorbed O was shown to represent up to about 20% of the NP surface for a 2 nm particle. A large gap between the fractions is observed when particle size grew beyond D=3 nm.

Figure 10A:
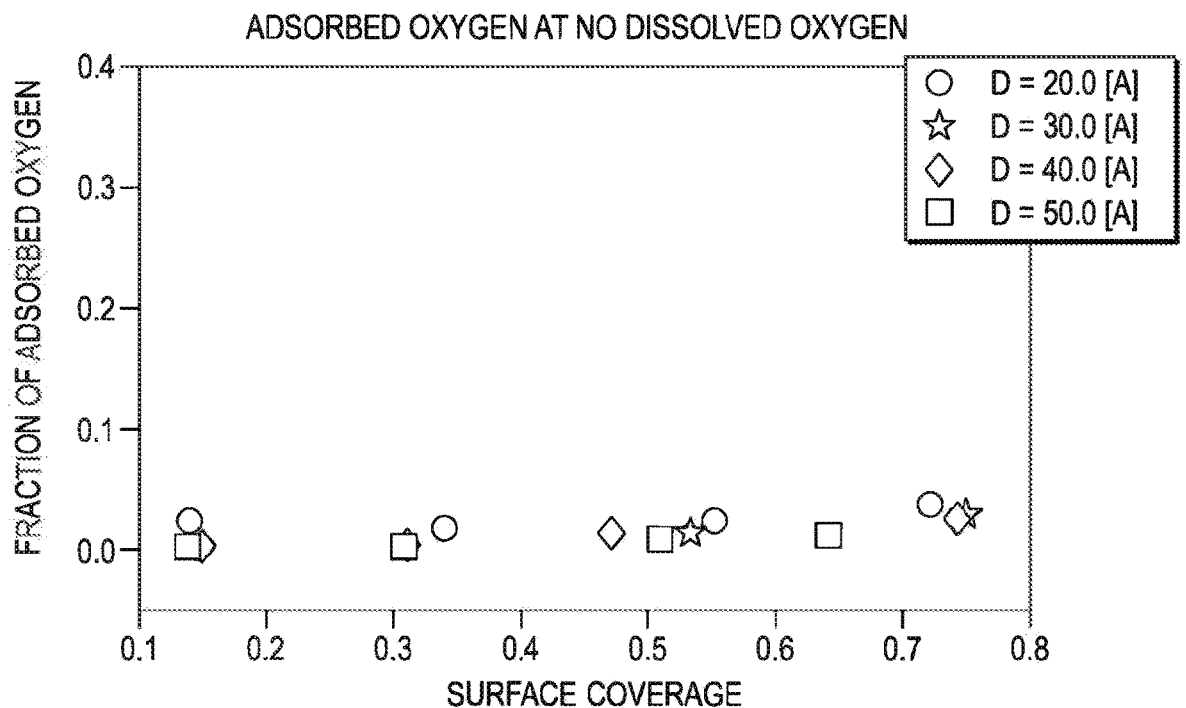
FIG. 10A shows a fraction of adsorbent oxygen at no dissolved oxygen for various particle sizes.
Figure 10B:
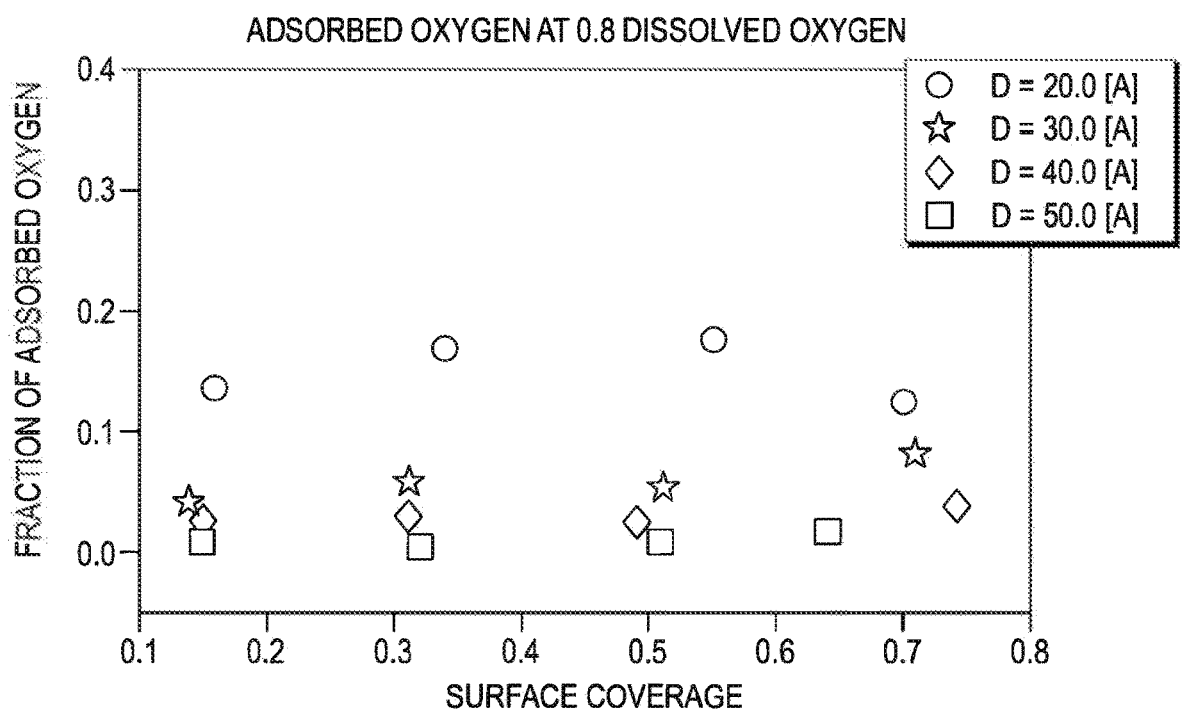
FIG. 10B shows a fraction of adsorbed oxygen at 0.8 dissolved oxygen for various particle sizes.

FIGS. 10A and 10B show the plots of fraction of adsorbed oxygen at no dissolved oxygen and 0.8 dissolved oxygen, respectively, versus NP surface coverage.

The overall results show that the combined effect of amorphous nature of the ultra-fine particle and presence of highly undercoordinated atoms on its surface makes the particle a single-atom-like catalyst which is able to attract dissolved oxygen in water to its surface. Specifically, the 2 nm amorphous particle exhibited a strong catalytic signal compared to the larger 5 nm particle size NP.

Experiment B2

Figure 11A:
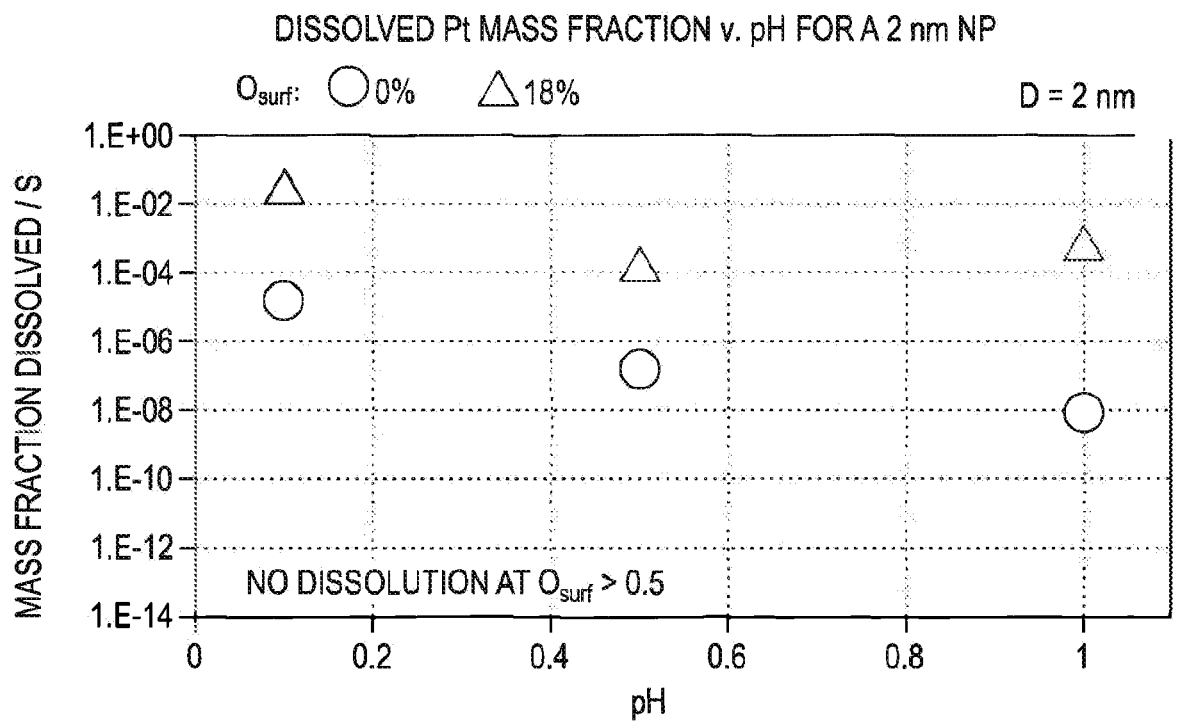
FIG. 11A shows a plot of dissolved Pt mass fraction versus pH for a 2 nm NP.
Figure 11B:
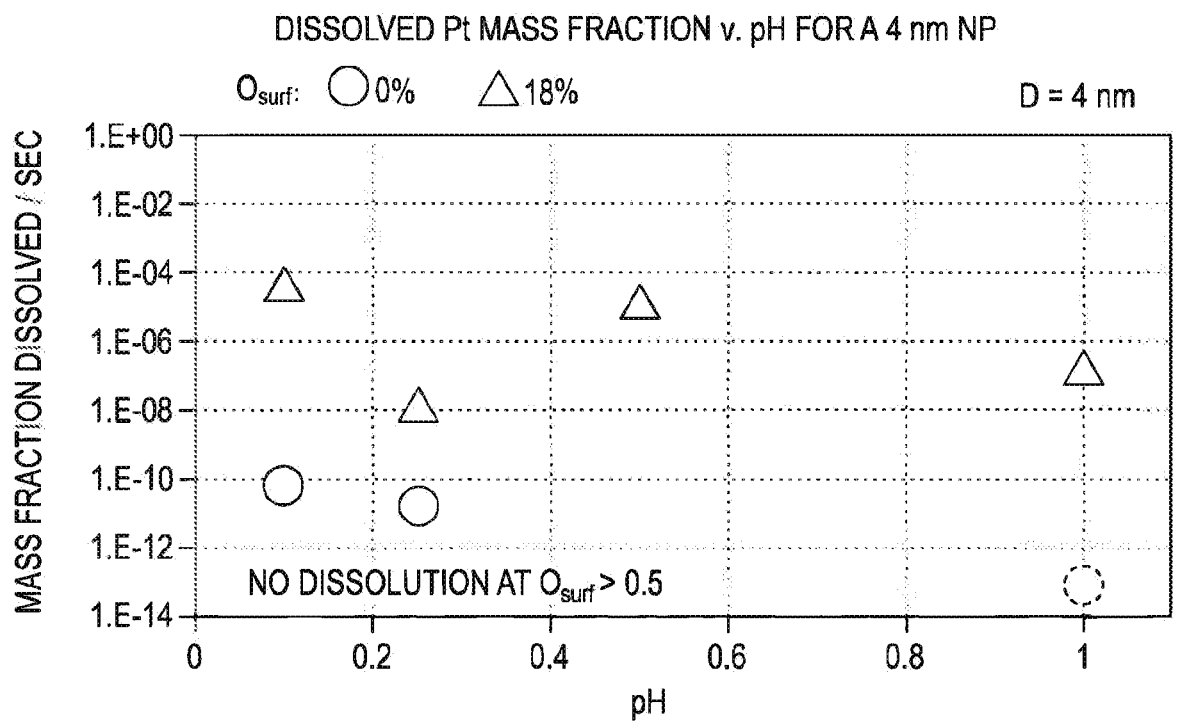
FIG. 11B shows a plot of dissolved Pt mass fraction versus pH for a 4 nm NP.

Pt dissolution in highly acidic environments (low pH) was studied and the amount of mass dissolved was correlated to the extent of surface oxidation. FIGS. 11A and 11B show data quantifying the damaging effect of increasing acidity of a medium on 2 nm and 4 nm particles. In both FIGS. 11A, 11B, the oxygen surface coverage was either 0% (circles) or 18% (triangles). The effect of particle size was observed when comparing filled and unfilled markers where a 2 nm particle has about 2 orders of magnitude higher dissolved mass fraction at the same conditions compared to a 4 nm particle.

As can be further seen in the FIGS. 11A, 11B, the percent Pt mass dissolved increased with the increase of levels of acidity. Reducing pH from 1 to 0.1 increased percent mass dissolved by about 2 orders of magnitude. The range of pH investigated was limited by the number of atoms in the MD system, but the pH range represented an extreme level of acidity that would accelerate particle dissolution, simulating the highly acidic environment of an electrochemical cell. The effect of particle size was seen by comparing the two plots of FIGS. 11A, 11B with filled and unfilled markers. FIGS. 11A and 11b show dissolved Pt mass fraction for different levels of acidity and degree of oxidation for a 2 nm particle and a 4 nm particle, respectively.

The 2 nm particle showed a significant propensity to lose mass compared to a 4 nm particle at the same reducing conditions consistent with the classical theory of Gibbs-Thomson. The impact oxide coverage was quite prominent and applied a non-trivial driving force to dissolution. At low oxide coverage (18%), mass loss was amplified for all ranges of pH independent of particle size. Percent Pt mass dissolved increased by 3-4 orders of magnitude. Hence, low levels of oxidation (18% coverage) increased dissolution by about 3-4 orders of magnitude. This substantial increase in mass loss was caused by the local oxidized regions on NP surface that acted as degradation hotspots due to their locally strained structure. On the other hand, the dissolution was halted in MD simulations when oxide coverage exceeded 50%. The uniformly amorphous skin of platinum oxide created a stable corrosion resistive layer that minimized loss of Pt mass. The passivating effect of higher platinum oxide can also be rationalized by calculating oxygen vacancy formation energies using DFT ($Pt_3O_4$: 3.1 eV/O, $PtO_2$:2.8 eV/O). The high values of energy penalty of oxygen extraction pointed to the increased stability of the higher oxide forms of Pt.

Potentiostatic holds at different voltages between 0.8 and 1.5V showed an initial increase in Pt dissolution up to a maximum voltage of about 1.1V, after which dissolution got consistently reduced with the increase in voltage for all particle sizes. Further increase in dissolution started to emerge beyond the 1.3V that is driven by carbon corrosion. Hence, both experimental and computational work confirmed the damaging effect of partial surface oxidation (at low potential~1V) and the passivating effect of higher oxide surface coverage (at high potential~1.3V).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrocatalyst comprising:
a conglomerate of platinum atoms forming an amorphous nanoparticle structure having at least about 40% of highly undercoordinated surface atoms with fewer than 6 adjacent atoms on its surface; and
a passivating crust including catalytically active monoatomic adsorbed oxygen atoms such that at least 50% of the amorphous nanoparticle structure has oxygen coverage,
the amorphous nanoparticle structure having a diameter of up to 3 nm.

2. The electrocatalyst of claim 1, wherein the amorphous nanoparticle structure has a disorderly, irregular surface lacking a clear facet organization.

3. The electrocatalyst of claim 1, wherein the amorphous nanoparticle structure includes an amorphized internal structure.

4. The electrocatalyst of claim 1, wherein the passivating crust further comprises one or more species of $PtO_x$, where x is 1-3.

5. The electrocatalyst of claim 4, wherein a ratio of the monoatomic adsorbed oxygen atoms to the one or more species of $PtO_x$ is up to about 3:1.

6. The electrocatalyst of claim 1, wherein the electrocatalyst has an internal structure more orderly than an outer surface.

7. The electrocatalyst of claim 1, wherein the amorphous nanoparticle structure comprises at least about 50% Pt.

8. The electrocatalyst of claim 1, wherein the passivating crust is amorphous.

9. A cathode catalyst layer comprising:
an electrocatalyst support;
an electrocatalyst attached onto the support, the electrocatalyst having
a highly amorphous nanoparticle structure comprising a plurality of inner atoms and surface atoms, the surface atoms comprising at least about 30% atoms with lone pairs having a coordination number of less than 6, based on the total mass of the surface atoms; and
a stable corrosion-resistive layer of adsorbed oxygen species covering at least 50% of the surface atoms.

10. The cathode catalyst layer of claim 9, wherein the adsorbed oxygen species include a catalytically active monoatomic oxygen.

11. The cathode catalyst layer of claim 9, wherein the adsorbed oxygen species include one or more species of $PtO_x$, where x is 1-3.

12. The cathode catalyst layer of claim 9, wherein the highly amorphous nanoparticle structure comprises at least about 50% Pt.

13. The cathode catalyst layer of claim 9, wherein the highly amorphous nanoparticle structure has a diameter of up to about 3 nm.

14. The cathode catalyst layer of claim 9, wherein more than about 50% of the inner atoms have a coordination number of up to 12.

15. The cathode catalyst layer of claim 9, wherein an entire electrocatalyst is non-crystalline.

16. An electrochemical cell comprising:
an anode;
a membrane separating the anode from a cathode; and
the cathode including a cathode catalyst layer having an electrocatalyst comprising a plurality of platinum ultrafine, highly amorphized nanoparticles, each having a diameter of up to about 3 nm and having an amorphous inner core covered with a passivating crust of oxygen species adsorbed onto the surface of the amorphous inner core at more than 50% surface coverage.

17. The electrochemical cell of claim 16, wherein the oxygen species include a catalytically active monoatomic oxygen.

18. The electrochemical cell of claim 16, wherein the oxygen species are dispersed on the surface of the amorphous inner core in an irregular manner.

19. The electrochemical cell of claim 16, wherein the cathode catalyst layer further includes a second Pt electrocatalyst having a diameter greater than 3 nm.

* * * * *